March 7, 1950 — H. E. SWARTOUT — 2,499,426
GAUGE FOR WIRE WINDING MACHINES
Filed April 18, 1946 — 9 Sheets-Sheet 1

INVENTOR.
HAROLD E. SWARTOUT
BY
J. H. Church & H. E. Thibodeau
ATTORNEYS

March 7, 1950

H. E. SWARTOUT 2,499,426

GAUGE FOR WIRE WINDING MACHINES

Filed April 18, 1946

INVENTOR.
HAROLD E. SWARTOUT
BY
J. H. Church + H. E. Thibodeau
ATTORNEYS.

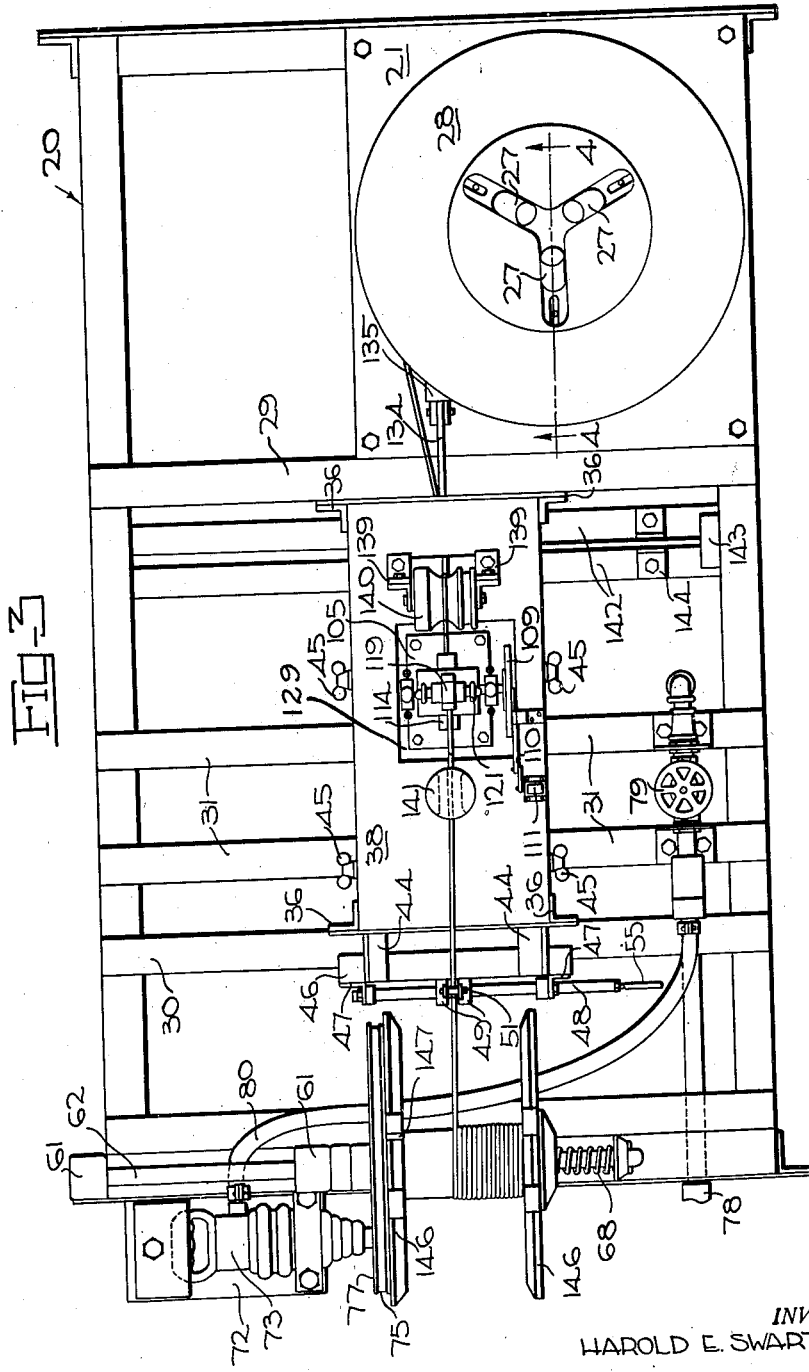

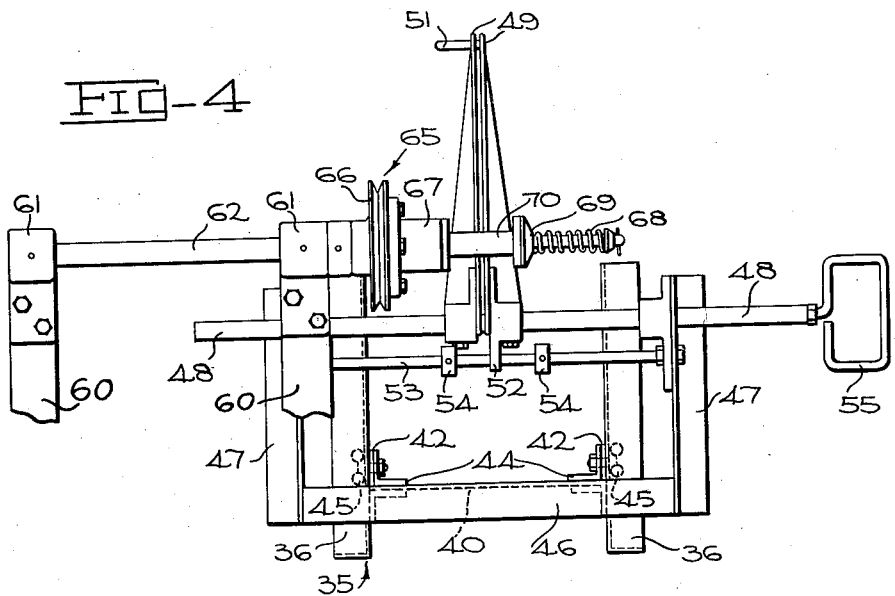
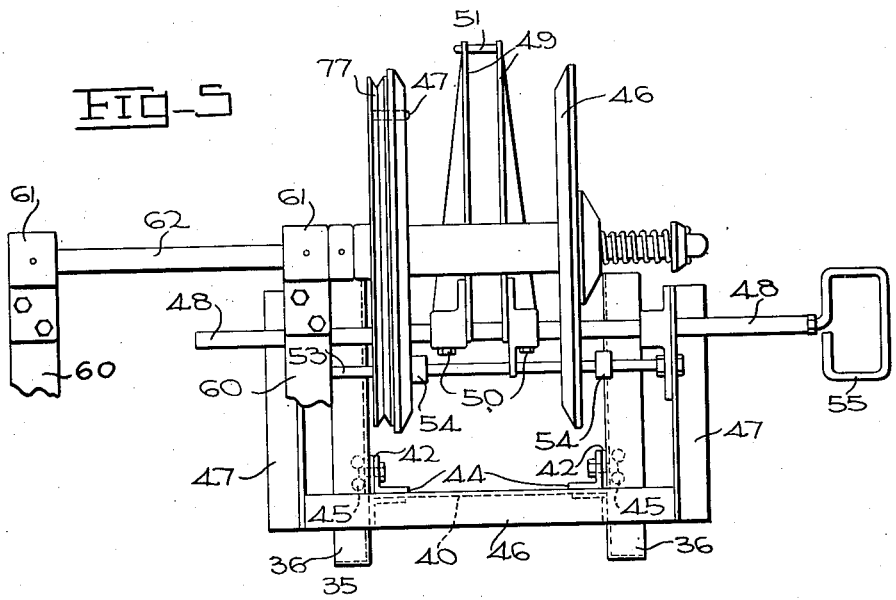

March 7, 1950 H. E. SWARTOUT 2,499,426
GAUGE FOR WIRE WINDING MACHINES
Filed April 18, 1946 9 Sheets-Sheet 5
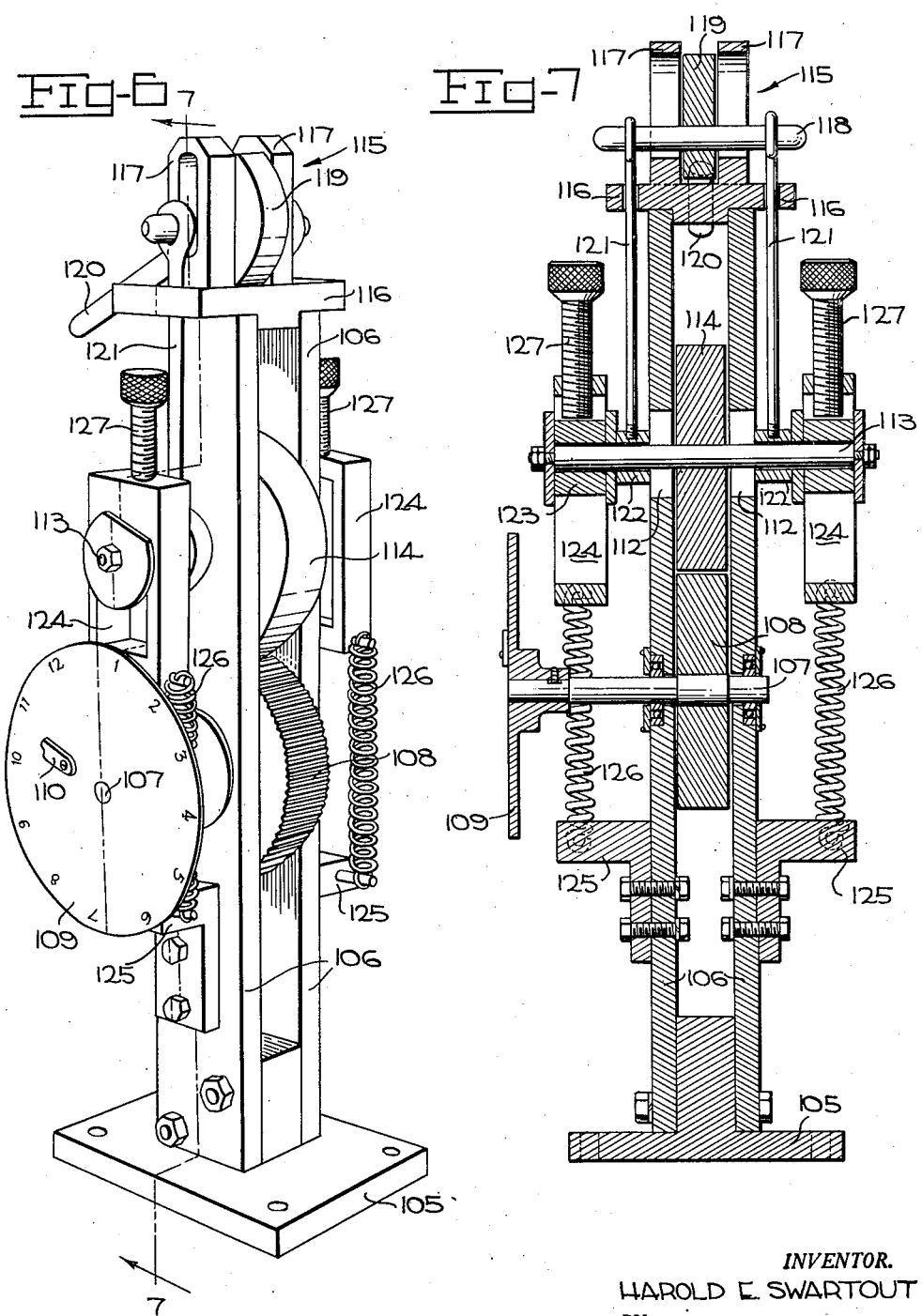
INVENTOR.
HAROLD E. SWARTOUT
BY
J. H. Church & H. E. Thibodeau
ATTORNEYS March 7, 1950 H. E. SWARTOUT 2,499,426
GAUGE FOR WIRE WINDING MACHINES
Filed April 18, 1946 9 Sheets-Sheet 6
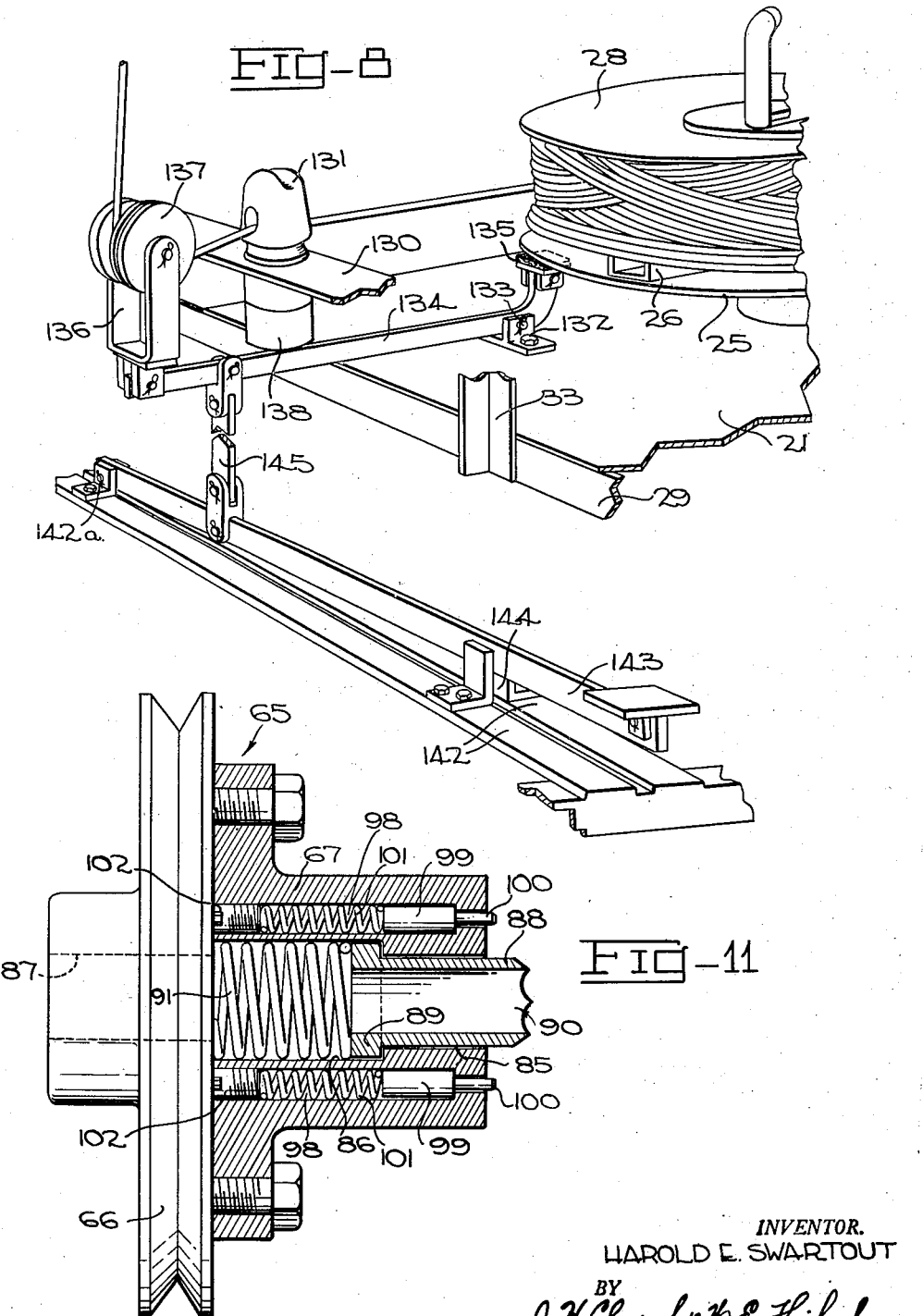
INVENTOR.
HAROLD E. SWARTOUT
BY
J. H. Church & W. E. Thibodeau
ATTORNEYS

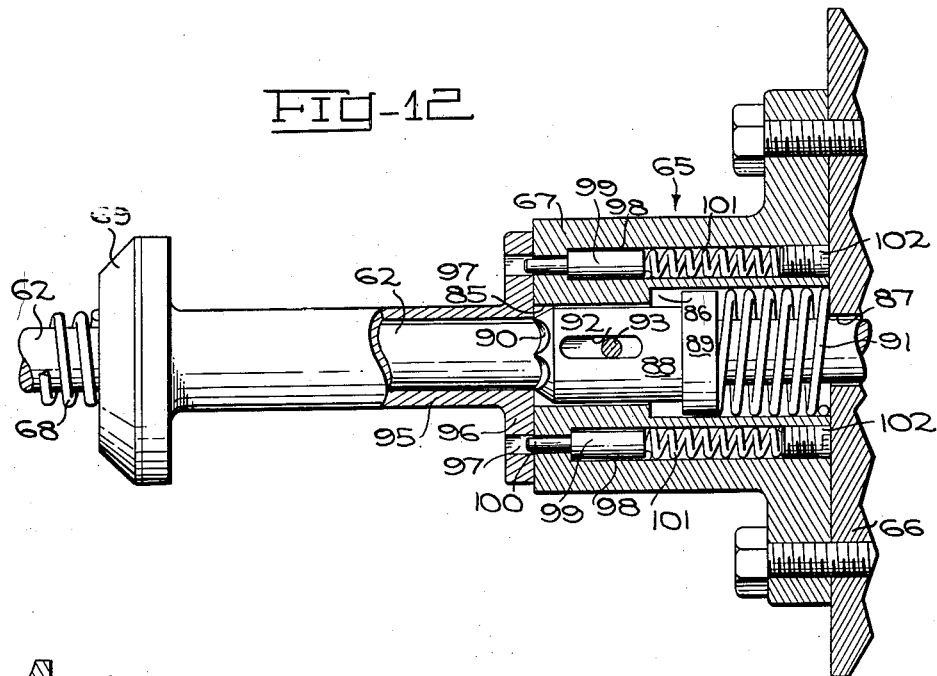
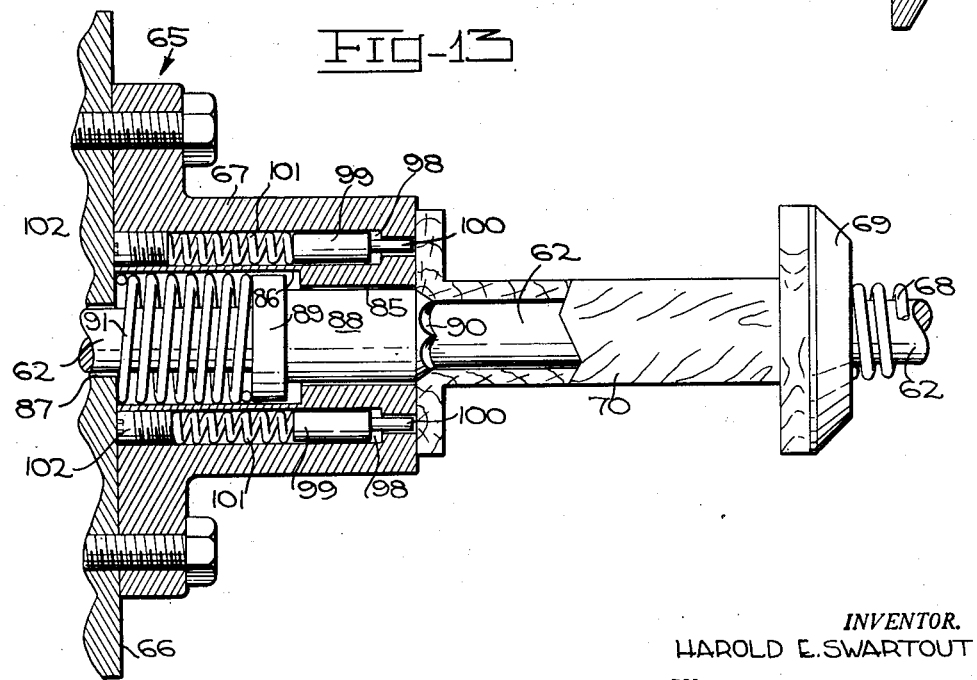

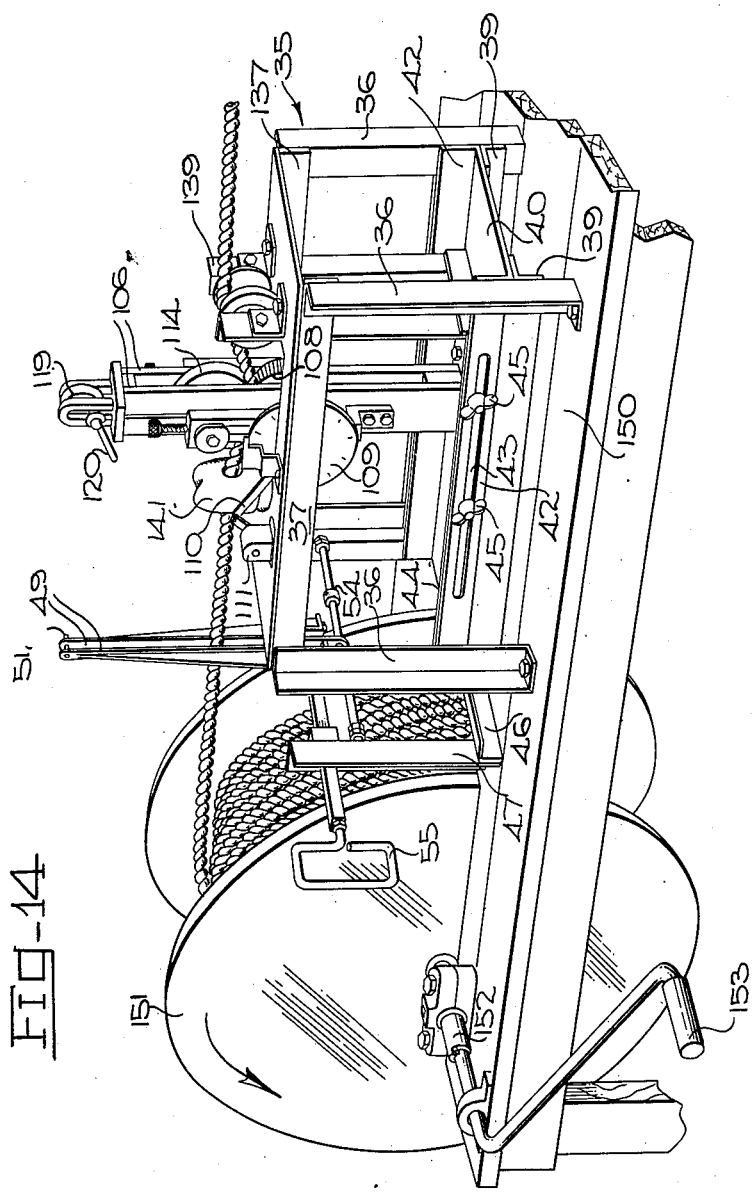

Patented Mar. 7, 1950

2,499,426

UNITED STATES PATENT OFFICE 2,499,426

GAUGE FOR WIRE-WINDING MACHINES

Harold E. Swartout, Davenport, Iowa

Application April 18, 1946, Serial No. 662,994

5 Claims. (Cl. 33—134)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a machine for winding wire or the like and in its broader aspects pertains to improvements in a machine for handling wire, cable, rope, conduit or similar material of relatively small cross sectional area.

The invention contemplates and has for its principal object the provision of an improved machine of the type referred to that is simple in construction and efficient in operation and that is well suited for general use in the handling of material of the class referred to. A preferred embodiment of the invention, as will be hereinafter more fully described and illustrated, finds its greatest usefulness in connection with the winding of wire from large spools or the like onto smaller reels. In many instances wire is furnished in large quantities in loose coils or is wrapped or coiled around spools in such a manner that it is not readily available for use and must necessarily be unwound in definite quantities so that it may be more easily handled in particular instances. According to the present invention wire or the like may be transferred from the coil, spool or other form in which it is furnished to a smaller reel and at the same time the quantity of wire or the like wound on the smaller reel may be measured by suitable mechanism forming part of the general construction provided by the present invention.

It is an important object of the invention to provide a machine involving unit arrangement of parts so that certain of the parts may be removed from assembled relationship and used independently of the other parts without requiring any variation in the structure or mode of operation thereof.

Another important object of the invention is to provide means for supporting a coil or spool of wire or the like in its original form and to provide means for transferring the wire to a smaller spool or reel and to incorporate in the transferring mechanism means responsive to variations in tension of the wire between the source spool and the end spool or reel for controlling the speed at which the wire or the like is unwound from the source spool; a subsidiary object is to include in the speed-regulating means a control member by which such means may be manually controlled.

Still another important object of the invention is to provide means for measuring quantities of wire or the like transferred from the source spool to the end spool and to include in such measuring means mechanism providing for adjustment of such means for the handling of material of different sizes.

The invention has for another object the provision of means for supporting a reel or the like on which the wire or other material may be wound and to include in such means level-winding mechanism for winding the transferred wire or other material uniformly on the reel; another object is to provide means whereby the level-winding mechanism may be adjusted to accommodate different sizes of wire or the like.

Another object of the invention is to provide improved driving means for the reel mechanism and to adapt said driving means for the driving of reels of different types and sizes.

The foregoing and other important objects and features of the invention will appear more clearly in the following detailed description of a preferred embodiment of the invention as illustrated in the accompanying sheets of drawings in which:

Figs. 2 and 3 are respectively side and plan views of the same machine, there being illustrated in these figures a different type of reel on which wire or the like may be wound;

Fig. 4 is an enlarged end view of the level-winding mechanism showing the use of such mechanism with the reel illustrated in Fig. 1;

Fig. 5 is a view similar to Fig. 4 but showing the use of the level-winding mechanism in conjunction with the reel illustrated in Figs. 2 and 3 and illustrating further the adjustability of the guide means;

Fig. 6 is an enlarged perspective view of the measuring mechanism;

Fig. 7 is a cross sectional view taken on the line 7—7 of Fig. 6 and showing the details of construction of the measuring mechanism;

Fig. 8 is an enlarged fragmentary perspective view showing the speed-regulating means;

Figure 10:
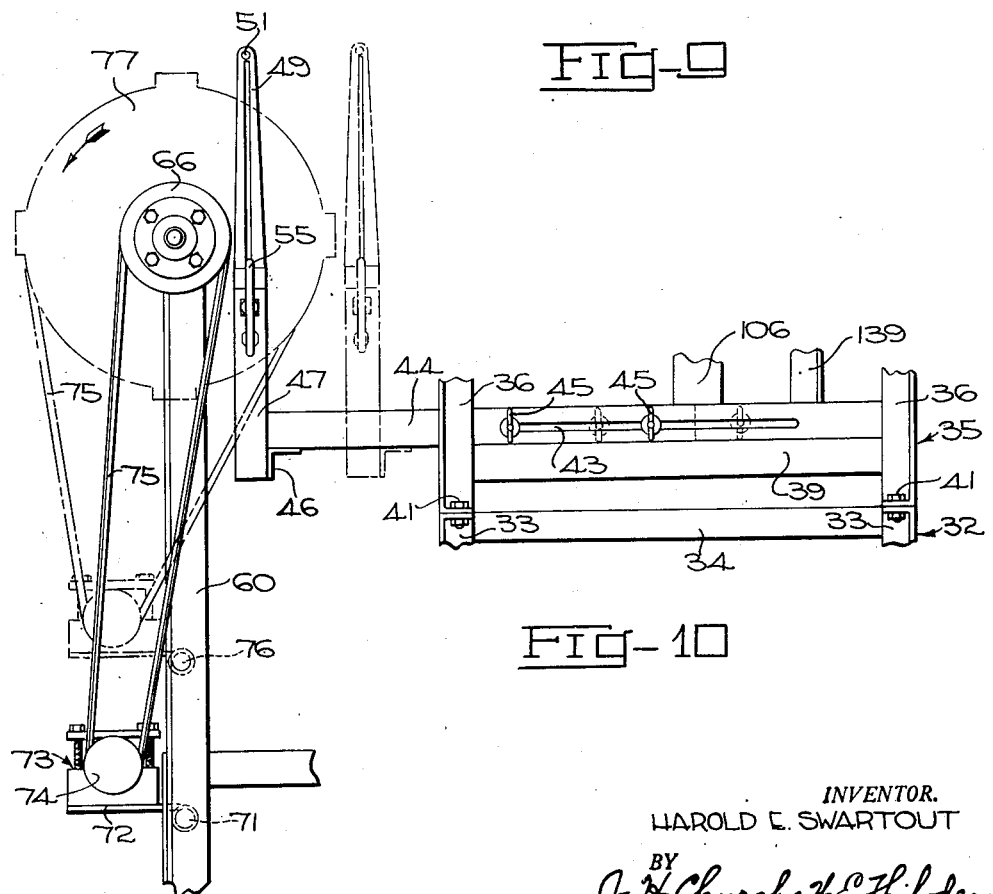

Fig. 10 is a side view of a portion of the level-winding mechanism and the reel-supporting structure illustrating the adjustability of the level-winding mechanism and of the driving means for the reel, the adjustability of the level-winding mechanism and of the driving means being shown by these parts drawn in dotted lines in positions which are different from those occupied by these parts illustrated in full lines;

Fig. 11 is an enlarged view, partly in section, of the driving chuck for the reel;

Figs. 12 and 13 are views of the driving chuck shown in Fig. 11 and illustrating the use of the chuck with reels of different types; and Fig. 14 is a perspective view illustrating the use of one unit of the machine in an instance where cable or the like is desired to be manually wound on a large reel or spool.

Figure 2:
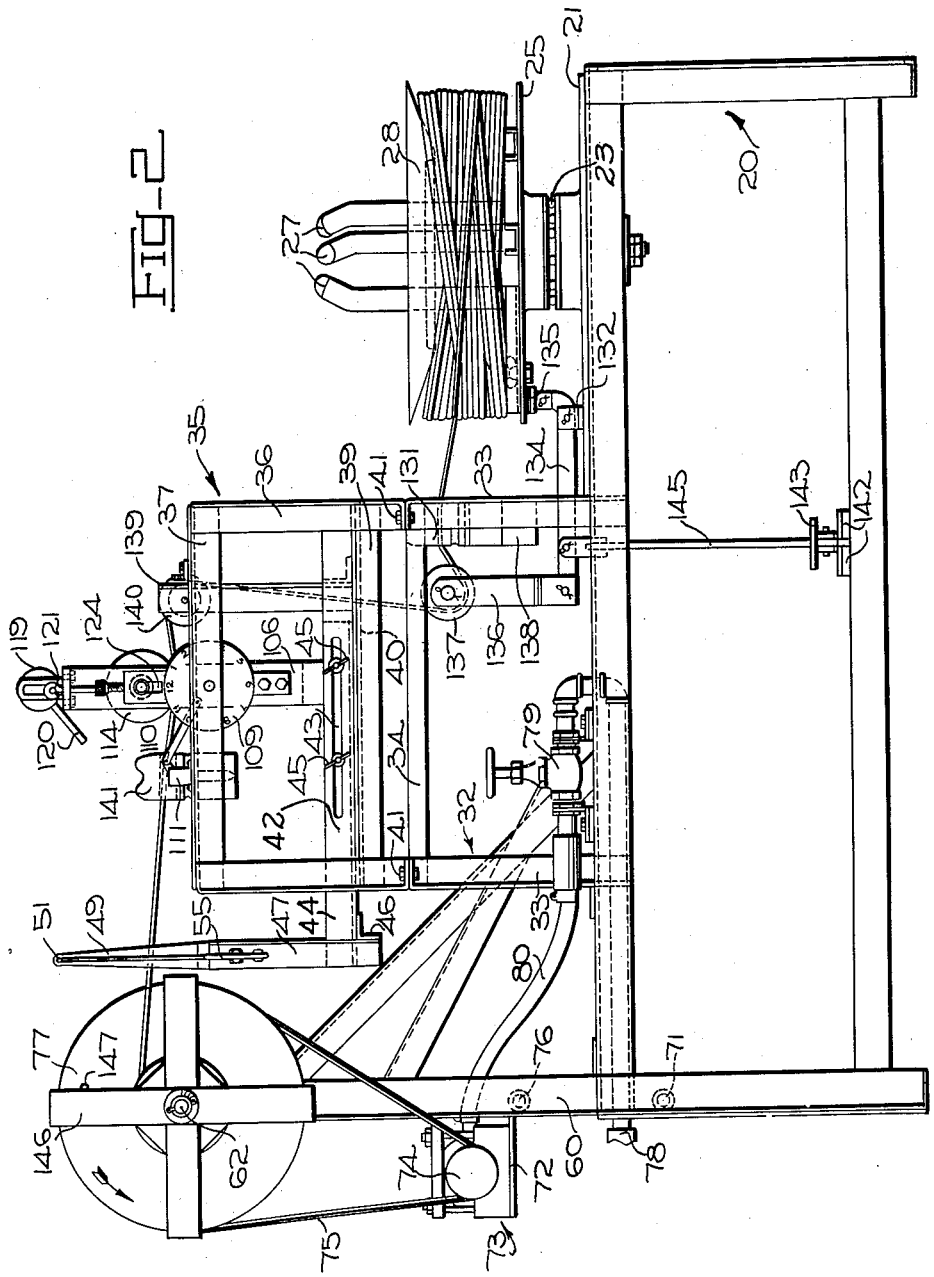
Figure 9:
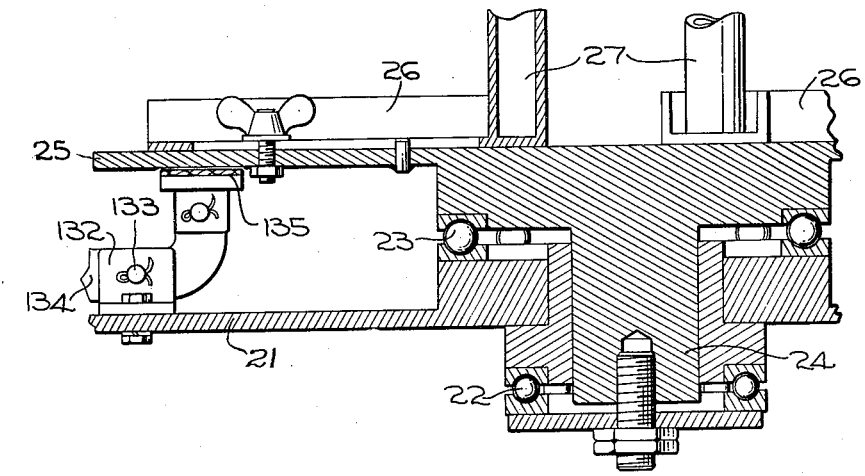
Fig. 9 is an enlarged fragmentary cross sectional view illustrating further details of the structure shown in Fig. 8.

The particular machine chosen for the purposes of illustration includes a base frame 20 preferably constructed of a plurality of angle bars or other suitable elements and having at one end thereof transverse supporting structure preferably formed by a transverse plate 21. As best shown in Figs. 2 and 9, the plate 21 is provided at its central portion with antifriction bearings 22 and 23 which journal the vertical hub portion 24 of a coil-carrying member or disk 25. This member includes a plurality of radially extending channels 26 and a plurality of upright guide members 27. The members 27 are arranged to provide a skeleton spindle to receive a top plate 28. The disposition of the upright guide members 27 and the radially extending channels 26 is such as to constitute carrying means adapted to receive wire or other material that may have been furnished originally merely in loosely coiled form and not wound upon a spool. In operation the top plate 28 serves to prevent the loosely coiled wire from overrunning or being thrown off of the guide members 27.

Figure 1:
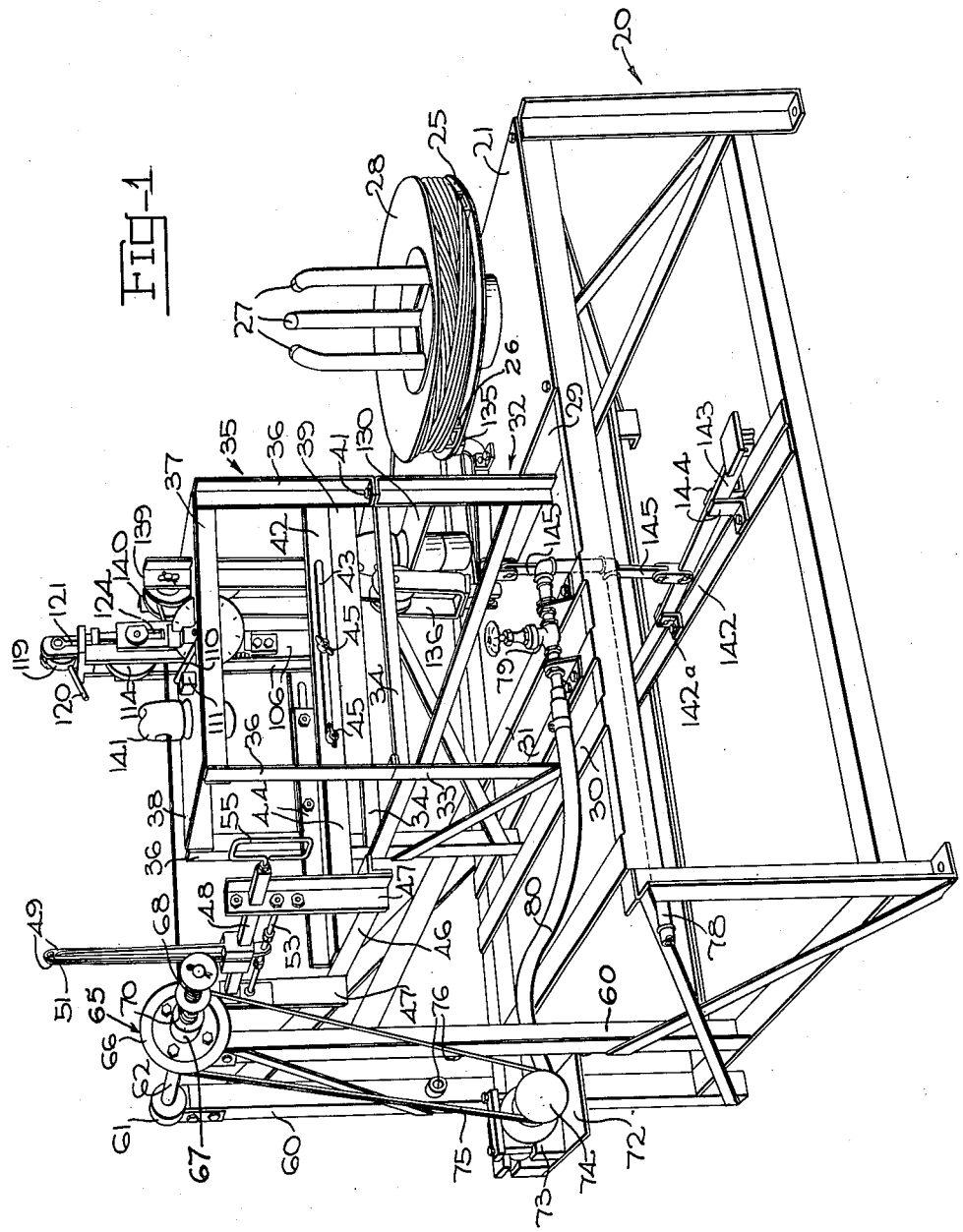
Fig. 1 is a perspective view of a machine constructed according to the principles of the invention.

As best shown in Figs. 1 and 3, the transverse supporting plate 21 is bounded along its transverse inner edge by a transverse supporting member 29 which parallels a second transverse supporting member 30 disposed near the other end of the base frame 20. A second pair of transverse members 31 cross-connects the longitudinal side members of the frame 20 and serves to support additional structure of the machine, as will be hereinafter set forth. The transverse members 29 and 30 serve to support an intermediate or secondary frame, indicated generally at 32, which comprises a plurality of upright frame members 33, connected rigidly at their upper ends to a horizontal, rectangular frame 34. These members are arranged to provide a rigid box-like framework on the frame 20.

The secondary frame 32 serves as means for supporting an upper unit designated generally by the numeral 35. This unit is likewise preferably constructed of angle bars and other suitable members and includes four corner posts 36 connected at their upper ends to a pair of transversely spaced, longitudinally running side frame members 37 across which is connected a horizontal supporting plate 38. The lower portion of the unit is provided with a pair of longitudinally running side frame members 39 preferably in the form of steel bars having their upper edges provided with means for supporting a horizontal lower supporting plate 40. The lower portions of the corner posts 36 are horizontally flanged and drilled and rest respectively upon similarly flanged and drilled portions on the upper ends of the supporting members 33 of the secondary frame 32. The supporting relationship between each upright member 33 and its respective corner post 36 is completed by removable securing means, herein indicated as a bolt 41. As will hereinafter be more clearly brought out, this arrangement provides for the removal of the unit 35 from the rest of the machine. This removal is accomplished simply by removal of the securing bolts 41.

The lower supporting plate 40 of the unit 35 is provided at each of its longitudinal edges with a vertically disposed flange 42 in which is formed a longitudinally running slot 43. A pair of parallel, longitudinally running supporting members, preferably in the form of angle bars 44, is slidably supported for longitudinal movement on the lower supporting plate 40. Securing means 45 in the form of bolts and wing nuts serve to connect the longitudinal bars 44 to the longitudinal flange members 42 for longitudinal adjustment of the former with respect to the latter, the bolts of the securing means passing through the members 44 and through the slots in the complementary flanged members 42. The outer ends of the longitudinal members 44 are cross-connected by a transverse support 46, herein indicated as an angle bar, which carries a pair of transversely spaced, upright angle bars 47, each of which is provided at its upper end with a transverse opening slidably receiving a transversely movable slide member or bar 48. This bar carries intermediate its ends a pair of vertically extending guide members 49, each of which is adjustably secured to the slide bar 48 by means of cap screws 50 (Fig. 5). One of the members 49 has at its upper end a transverse pin 51 which passes through a complementary opening at the upper end of the other member (Figs. 4 and 5). The lower end of one member includes a depending, transversely drilled lug 52 through which passes a transverse rod 53 supported at its opposite ends in the upright members 47. The rod 53 carries at each side of the depending lug 52 on the member 49 a pair of adjustable collars 54, which may be adjusted transversely on the rod 53 to vary the extent to which the slide bar 48 may be reciprocated in the members 47. One end of the slide bar 48 is provided with suitable means in the form of a handle 55 so that the slide bar and guide means 49 may be manually reciprocated.

As best shown in Fig. 1, the end of the base frame 20 adjacent the level-winding mechanism just described is provided with a pair of transversely spaced, vertically extending supporting posts 60, the upper end of each of which is provided with a suitable bearing 61 in which is journaled a transverse reel shaft 62. This shaft extends in proximity to the level-winding mechanism 47—55 and parallels the path of reciprocation of the slide bar 48. As will be more fully described below, the shaft 62 may carry any one of several types of reels on which wire or the like may be wound.

Referring now to Figs. 1 and 4, it will be seen that the shaft 62 carries thereon for rotation therewith a reel-driving chuck indicated generally by the numeral 65. This chuck includes a driving pulley 66 and a chuck body or hub 67. The outboard end of the shaft carries compression means in the form of a spring 68 and washer 69 between which and the chuck body 67 a small reel 70 may be carried and driven by the chuck 65. The lower portions of the supporting posts 60 carry a pair of transversely aligned supporting pins 71 (Fig. 10) which carry a supporting plate 72 for swinging movement on a transverse axis. This plate serves to carry drive means for the reel-driving mechanism. In the present instance the drive means is indicated as being an air motor 73 having a driving pulley 74. A flexible driving belt 75 is trained about the pulley 74 on the motor 73 and about the pulley 66 on the chuck 65. The supporting posts 60 are provided with a second pair of supporting pins 76 spaced above the supporting pins 71 and adapted for the supporting of the plate 72 in a higher position in the event that the reel shaft 62 is fitted with a larger pulley in place of the smaller pulley 66 on the chuck 65. Such substitution is indicated in Figs. 2 and 3, there being indicated a pulley 77 of substantially increased diameter. The relationship between the two mountings of the motor 73 on the pivot or supporting pins 71 and 76 is such that the same belt 75 may be used whether the reel shaft 62 carries the small pulley 66 or the large pulley 77; in the use of the small pulley, the motor will be supported by the lower pins 71 and, in the use of the large pulley, the motor will be supported by the upper pins 76.

The motor 73 may be suitably powered by air pressure directed through a conduit 78 supported by the frame 20 and connected to a control valve 79 that is carried by the transverse frame members 31 on the frame 20. A suitable conduit 80 is connected between the control valve 79 and the motor 73. It will be understood, of course, that any suitable motor or other driving means may be substituted for that indicated herein.

As stated above, it is an important object of the present invention to provide reel-driving means including a driving chuck that is adapted to drive reels of different types. The chuck 65, as best shown in Fig. 11 and as previously described in connection with the driving of the reel 70, is formed with an axial bore 85 coaxial with a slightly larger bore 86. The drive pulley 66 is formed with an axial bore 87 coaxial with the bores 85 and 86. The chuck 65 is thus adapted for mounting on the reel shaft 62. The chuck body 67 is provided with means for driving either a wooden reel or a metal reel. For this purpose the axial bore 85 receives axially slidably therein a first reel-engaging member 88 preferably formed from tubular stock and having at its inner end an annular flange 89 abutting the shoulder formed by the reduction in diameter between the coaxial bores 86 and 85. The outer end of the member 88 is provided with a plurality of teeth 90 adapted to engage the central end portion of a wooden reel. Yieldable means in the form of a compression spring 91 is disposed in the axial bore 86 between the annular flange 89 on the member 88 and the radial portion of the pulley 66 that surrounds the bore 87. This means serves to urge the reel-engaging member 88 axially outwardly. As best shown in Fig. 13, the wooden reel 70 is supported on the shaft 62 and engaged between the reel-engaging member 88 and the compression means 68—69. As shown in Fig. 12, the member 88 is formed with a slot 92 running longitudinally thereof and cooperating with a driving pin 93 carried by the chuck body 67.

Fig. 12 indicates the use of a different type of reel, for example a metal reel, designated generally at 95 and having a radial flange 96 provided with a plurality of openings or bores 97. For the purpose of driving a reel of this type the chuck 65 has formed in the body thereof a plurality of bores 98 spaced radially from and paralleling the axis of the bore 85. Each bore 98 is reduced at its outer end so that the chuck 67 is provided with a shoulder portion against which abuts a driving member 99 having a reduced end portion 100 which extends outside the chuck body 67 and into engagement with the flange 96 on the reel 95, the driving portions 100 entering the openings 97 in the reel flange. A plurality of yieldable means 101 preferably in the form of compression springs are arranged respectively in the bores 98 and serve to urge the members 99 into reel-engaging positions. Each bore 98 is preferably threaded at its other end and receives a threaded plug 102 which retains the spring 101. It will be understood that the plugs 102 may be omitted and the springs 101 be permitted to abut directly against the radial face of the driving pulley 66 if desired. However the use of the plugs 102 facilitates assembly and disassembly of the chuck 65 and for this purpose have been indicated as a preferred construction.

From a comparison of Figs. 12 and 13, it will be noted that when the wooden reel 70 is mounted on the shaft 62, the flanged portion thereof serves to effect retraction of the driving members 99, while the driving teeth 90 on the driving member 88 establish driving relationship between the chuck 65 and the reel. When the metal reel 95 is used, the driving members 99 extend into driving engagement with the flange 96 of the reel, and the central driving member 88 is retracted against compression of the spring 91. It will be understood, of course, that in the event that the shaft 62 carries a wooden reel having driving openings corresponding to the openings 97 in the reel 95, both driving elements 88 and 99 would be used. Ordinarily, however, only reels of the metal type are provided with openings corresponding to the openings 97 in the reel 95.

It is an object of the present invention to provide novel means for measuring the wire that is transferred from the source spool or coil under top plate 28 to any of the different types of reels that may be carried on the reel shaft 62. A preferred form of this mechanism is illustrated in Figs. 6 and 7 as having a base portion 105 and a pair of upright, parallel supporting members 106. The measuring mechanism forms a compact unit that is removably mounted on the lower supporting plate 40 of the unit 35 in a position intermediate the loosely coiled wire under the top plate 28 and the reel shaft 62, so that wire unwound from the coil and wound on a reel on the shaft 62 passes through the measuring mechanism and is measured thereby. The supports 106 journal a transverse shaft 107 to which is keyed a rotatable element in the form of a wheel 108 having its outer periphery serrated. The shaft 107 extends transversely and carries at its outer end a disk 109 to which is pivotally connected one end of a crank arm 110. The other end of the crank is connected in any suitable manner to counting mechanism indicated generally at 111. The counting mechanism per se forms no part of the present invention and has therefore not been illustrated in detail. The connection between the driving disk 109 and the counting mechanism is such that the wire or other material is measured in inches, although any other system of measurement may be used. Each of the members 106 is provided with a vertical slot 112. These slots are aligned and a transverse shaft 113 passes therethrough and carries a second rotatable element or wheel 114 having its peripheral portion in close proximity to the serrated periphery of the wheel 108. The upper ends of the members 106 carry a support 115 having a transverse portion provided with a pair of vertically drilled ears 116 and a pair of vertically slotted upright members 117. A short transverse shaft 113 passes through the slotted portions 117 and through a central control member 119 having an operating handle 120. The control member 119 is in the form of a cam member having a curved configuration adapted to engage the intermediate flat horizontal upper portion of the support 115. The short transverse shaft or pin 118 is eccentrically disposed with relation to the center of the arc forming the cam surface on the control member 119 so that, as the control member is rotated by the handle 120, the shaft or pin 118 moves vertically in the slotted portions 117 of the member 115. Each end of the shaft or pin 118 carries the upper end of a downwardly extending eyebolt 121, the lower end of which is anchored in a collar 122 carried on the transverse shaft 113 outside the respective supporting member 106. Vertical movement of the pin 118 as effected by the control member 119 is thus transmitted to the shaft 113 so that the wheel 114 may be moved away from and returned toward the serrated wheel 108, thus permitting separation of the wheels so that wire or other material may be passed therebetween.

Each of the opposite ends of the shaft 113 is fitted with a block 123 embraced by a vertically slotted adjusting member 124. Each support 106 has secured thereto a bracket 125, and a pair of tension springs 126 is connected between the adjusting members 124 and the bracket 125. The arrangement on opposite sides of the structure formed by the supports 106 is preferably identical. The upper end of each adjusting member 124 is threaded and receives an adjusting screw 127 engageable with the block 123 on the shaft 113. The springs thus tend to urge the shaft 113 and wheel 114 toward the wheel 108. However, this movement of the wheel 114 is limited by engagement between the control member 119 and the upper intermediate surface of the member 115. Thus, the relative positions of the wheels 108 and 114 are not disturbed by adjustment of the adjusting screws 127. In other words, tension of the springs 126 may be effected without disturbing the relationship between the wheels 108 and 114. Likewise the control member 119 may be rotated to separate the wheels and to return the wheels without affecting the operating tension on the springs 126. The upper plate 38 of the upper frame unit 35 is provided with a rectangular opening 129 through which the upright supports 106 extend when the base 105 is mounted on the lower plate 40 of the frame unit 35.

Figs. 8 and 9 illustrate the details of a preferred form of means for regulating the speed at which wire or the like is unwound from the loose coil under top plate 28 when transferred to a reel carried on the reel shaft 62. The two end uprights 33 of the secondary frame 32 adjacent the coil serve to mount a transverse support 130 which carries a guide member 131 having an opening through which the wire is passed from the coil. The upper surface of the transverse supporting plate 21 rigidly carries a bracket 132 provided with a transverse pin 133 on which is pivotally mounted a longitudinally extending control bar or arm 134. The end of the arm adjacent the coil is curved upwardly and is fitted with a brake shoe 135 adapted to engage the under radial surface of the spool-supporting member 25. The arm 134 extends longitudinally of the frame 20 and is provided at its end with a pivotally mounted yoke 136 carrying a sheave or pulley 137 about which the wire is trained after passing through the guide member 131. The guide member preferably extends below the transverse support 130 and includes means such as an abutment 138 which serves as stop means to limit upward swinging of the arm 134. The upper unit 35 is provided with a pair of vertically extending angle members 139 between which is pivotally carried a sheave or pulley 140. The wire from the coil is passed through the guide 131, around the pulley 137, upwardly and over the pulley 140 and between the wheels 108 and 114 of the measuring mechanism. The wire thence passes through the guide member 141 carried by the upper plate 38 of the upper unit 35. From this point the wire passes between the guide members 49 of the level-winding mechanism and thence to a reel on the reel shaft 62. Since the arm 134 is pivotally carried on the bracket 132 it may move vertically in response to variations in tension on the wire between the coil and the reel shaft 62 so that the brake shoe 135 is moved into and out of engagement with the spool-supporting member 25.

A lower transverse frame element 142, supported by the longitudinal side members of the base frame 20, includes a bearing bracket 142a on which is pivotally mounted one end of a transversely extending control member, herein shown as a foot pedal 143. A pair of guides 144 serves to guide vertical movement of the pedal 143 and a link 145 connects the pedal to the arm 134.

As best shown in Figs. 2 and 3 the reel shaft 62 includes a chuck having the pulley 77, previously described. The chuck in this case is particularly adapted for the driving of relatively large reels such as that indicated at 146 and for this purpose the pulley 77 includes a driving pin 147 adapted to engage a radially extending member on the reel 146. As previously indicated, the machine disclosed herein is adaptable to the winding of various types and sizes of flexible material on various types and sizes of reels and accordingly the design and arrangement of the driving mechanism have included a wide range of interchangeability of chucks.

Another feature of the adaptability of the machine and its component parts to various uses is indicated in Fig. 14, wherein it is shown that the upper unit 35 has been removed from the base frame 20 and secondary frame 32 and is separately supported on a supporting table such as that indicated at 150. As will be noted, the entire unit 35, together with the measuring mechanism and level-winding unit, is adapted for use in the winding of heavy rope or cable on a large reel 151, which is mounted on a shaft 152 carried in suitable bearings on the table 150. A crank 153 is rotatably carried on the table and is engageable with the shaft 152 to driven the same for rotating the reel 151.

In the following description of the use and operation of the machine herein illustrated and described, the machine will be spoken of in connection with its use in the winding of wire. However, it will be understood that the machine may be similarly used in the handling of like material such as cable, rope, conduit, etc. It often occurs that wire and similar material is furnished on large spools as well as in loosely coiled form. Therefore, reference to the machine and its use in connection with the winding of wire is to be taken as illustrative and not limiting.

As previously stated, the coil of wire is mounted on the coil-carrying member 25 and the free end of the wire is passed through the guide member 131 and under the sheave 137, whence it passes upwardly and over the sheave 140 and through the measuring mechanism. The control member 119 on the measuring mechanism is rotated to separate the wheels 108 and 114 so that the wire may be passed therebetween. The control member 119 is then rotated reversely to restore the wheels to position to engage the wire, the serrations on the wheel 108 serving as means whereby linear movement of the wire through the measuring mechanism rotates the wheel 108 to drive the disk 109 and hence the counting mechanism 111. The wire is then passed through the guide 141, thence through the guide members 49 of the level-winding mechanism, and is then connected to the reel, such as the reel 70, 95, or 146, on the reel shaft 62. A particular point on the wire between the guide 141 and the level-winding mechanism is selected as an index point and the counting mechanism is preferably set at zero. The motor 73 is operated to drive the chuck and reel and operation of the machine is continued until the desired quantity of wire is wound on the reel. The index point on the wire previously referred to will again be used in determining at what point the wire is to be cut after the desired quantity is wound on the reel.

In the event that a metal reel (such as that indicated at 95 in Fig. 12) is used, it is unnecessary to change the chuck 65, for, as previously set forth, the chuck 65 is adapted to drive either type of reel. In the event that it is desired to use a larger reel, such as the reel 146, it is necessary only to substitute the driving pulley 77 for the chuck and pulley 66 and further to shift the position of the motor 73 from the supporting pins 71 to the upper supporting pins 76, in which case the same driving belt 75 may be used.

As the machine is operated, tension on the wire between the coil and a reel on the reel shaft 62 will vary, principally because of the lack of uniformity in the winding of the wire on the coil. Ordinarily, this variation in tension would result in the occurrence of slack at different points in the wire between the spool and reel. However, in the present instance, the speed-regulating means serves to retard the speed of rotation of the coil so that this undesirable slack does not occur. The inherent weight of the arm 134, accentuated by the weight of the foot pedal 143 and connecting link 145, serves to pivot the arm 134 so that the brake shoe 135 engages the under surface of the spool-carrying member 25, which action normally brakes the speed of rotation to an extent sufficient to prevent surging. It is likewise undesirable for too much tension to be placed on the wire between the coil and reel. In the present instance, this undesirable characteristic is eliminated by means of the action of the braking means as effected by increased tension on the wire. Such increase in tension serves to swing the arm 134 upwardly so that the braking action of the shoe 135 is relieved. Undesirable tension is further eliminated because there is no positive driving connection between the spool-carrying member 25 and the coil so that some slippage can occur between these two elements. Unexpected or temporary slackness in the wire may be relieved by means of the operator through use of the foot pedal 143, which action positively brakes the spool-carrying member 25, and the frictional engagement between that member and the coil will serve to retard rotation of the coil so that the slack is shortly picked up by continued rotation of the reel.

In the use of the machine with the large type reel 146 the longitudinal adjustability of the level-winding mechanism provides for positioning of the mechanism in the desired location (Fig. 10). Likewise the adjustability between the members 49 of the level-winding mechanism permits variation in the spacing thereof to accommodate different sized wire (Figs. 4 and 5).

In the use of the unit 35 as illustrated in Fig. 14, the operation of the component parts thereof will be the same as previously described. However, in this instance, particularly in the winding of rope or cable, it may not be necessary to use the coil-supporting unit. In any event the adaptability of the measuring mechanism and level-winding mechanism is again illustrated, since both are adjustable to accommodate the increased thickness of the rope or cable that will be wound on the reel 151.

Another feature of the invention is the adaptability of the measuring mechanism for use independently of the machine for the measuring of material having relatively small cross sectional area, such as rods, conduits, bar stocks, etc. In other words the measuring mechanism is suitable for the measuring of any material having a size permitting passage of such material between the wheels 108 and 114.

It will be seen from the foregoing description that the objects hereinbefore enumerated are readily achieved in the preferred form of the invention herein disclosed. Objects of the invention other than those brought out in the foregoing description will undoubtedly occur to those skilled in the art, as will numerous modifications and alterations in structure and operation, all of which may be made without a departure from the spirit and scope of the invention as defined in the appended claims.

I claim:

1. A length-measuring device comprising spaced standards having elongated openings therein, a first wheel and shaft journaled between said standards, a second wheel and shaft received in vertically elongated openings in said standards, resilient means biasing said second wheel into engagement with said first wheel, means for varying the pressure exerted by said resilient means, means for separating said wheels against the urging of said resilient means, and crank means on one of said shafts for communicating the number of revolutions thereof.

2. The device of claim 1 wherein said pressure varying means comprises a housing with a vertically elongated slot receiving said second shaft, and screw means threaded through said housing and adapted to contact the shaft.

3. The device of claim 1 wherein the separating means comprises a cam and shaft journaled in elongated slots atop said standards and connecting rods integrating said cam shaft and said second shaft.

4. The device of claim 1 wherein one of said wheels is serrated peripherally.

5. A length-measuring device for filamentary materials comprising two spaced standards having vertically disposed elongated slots therein, a first wheel and shaft journalled between said standards, a crank arm on said shaft, a second wheel and shaft received in the said vertically disposed elongated openings in said standards, two housings each having a vertically elongated opening receiving said second shaft externally of the standards, screw means threaded through the top of the housing to vary the position of said second shaft in the openings in the housings, means to fix the position of the shaft in the housing, spring means urging the shaft and housing toward the bottom of the elongated openings in the standards, second elongated openings in the standards above the first, a cam between the standards on a camshaft received in said second elongated openings in the standards, and rods connecting the camshaft with the shaft of the said second wheel.

HAROLD E. SWARTOUT.

REFERENCES CITED

The following references are of record in the file of this patent:

UNITED STATES PATENTS

| Number | Name | Date |
|---|---|---|
| 338,244 | Briggs | Mar. 23, 1886 |
| 873,071 | Nixon | Dec. 10, 1907 |
| 952,005 | Fetherolf | Mar. 15, 1910 |
| 1,267,271 | Richardson | May 21, 1918 |
| 1,340,218 | Ellis | May 18, 1920 |
| 1,491,446 | Uber | Apr. 22, 1924 |
| 1,566,641 | Bell | Dec. 22, 1925 |
| 1,733,834 | Steele | Oct. 29, 1929 |
| 1,739,247 | Marchev | Dec. 10, 1929 |
| 1,946,455 | Davis | Feb. 6, 1934 |
| 1,987,079 | Rosenmund | Jan. 8, 1935 |
| 2,121,870 | Greene | June 28, 1938 |
| 2,163,402 | Mason | June 20, 1939 |
| 2,227,355 | Lawson | Dec. 31, 1940 |
| 2,232,956 | Mathey | Feb. 25, 1941 |